US011615045B2

(12) United States Patent
Lo et al.

(10) Patent No.: US 11,615,045 B2
(45) Date of Patent: Mar. 28, 2023

(54) LOW-PROFILE TABLET DOCKING SOLUTION

(71) Applicant: HEWLETT-PACKARD DEVELOPMENT COMPANY, L.P., Houston, TX (US)

(72) Inventors: Jose Ticy Lo, Houston, TX (US); Jesse T. Arnold, Houston, TX (US); Scott Gregory, Houston, TX (US); Chan-Woo Park, Houston, TX (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 174 days.

(21) Appl. No.: 16/081,336

(22) PCT Filed: Apr. 24, 2017

(86) PCT No.: PCT/US2017/029153
§ 371 (c)(1),
(2) Date: Aug. 30, 2018

(87) PCT Pub. No.: WO2018/199898
PCT Pub. Date: Nov. 1, 2018

(65) Prior Publication Data
US 2021/0209048 A1  Jul. 8, 2021

(51) Int. Cl.
*G06F 13/40* (2006.01)
*H04W 4/80* (2018.01)
(Continued)

(52) U.S. Cl.
CPC ........ *G06F 13/4068* (2013.01); *G06F 1/1632* (2013.01); *G06F 1/266* (2013.01); *G06Q 20/206* (2013.01); *H04W 4/80* (2018.02)

(58) Field of Classification Search
CPC .... G06F 13/4068; G06F 1/1632; G06F 1/266; H04W 4/80; G06Q 20/206
See application file for complete search history.

(56) References Cited

U.S. PATENT DOCUMENTS 6,119,184 A * 9/2000 Takahama ............. G06F 1/1632
361/679.4
6,532,152 B1  3/2003 White et al.
(Continued)

FOREIGN PATENT DOCUMENTS

TW        M538268       3/2017
WO     2017/007916 A1   1/2017

OTHER PUBLICATIONS

Piltch, "Meet the Smart Magnets That Hold Your 2-in-1 Together", Retrieved from internet—https://www.laptopmag.com/articles/polymagnet-smart-magnets, Jan. 13, 2016, 8 Pages.

*Primary Examiner* — Henry Tsai
*Assistant Examiner* — John B Roche
(74) *Attorney, Agent, or Firm* — Knobbe, Martens, Olson & Bear, LLP (57) ABSTRACT

Examples provided herein provide a docking device for a computing device. In one example, the docking device includes a magnet array to align the computing device with a mounting device on the docking device. The docking device includes a locking blade that inserts from the mounting device into the computing device in a 3-dimensional (3D) motion.

20 Claims, 10 Drawing Sheets

(51) Int. Cl.
*G06F 1/16* (2006.01)
*G06F 1/26* (2006.01)
*G06Q 20/20* (2012.01)

(56) References Cited

U.S. PATENT DOCUMENTS

| | | | |
|---|---|---|---|
| 6,629,182 B1 * | 9/2003 | Mizoguchi | G06F 1/1632 |
| | | | 710/303 |
| 8,234,509 B2 | 7/2012 | Gioscia et al. | |
| 8,352,660 B2 * | 1/2013 | Rui | G06F 13/00 |
| | | | 710/300 |
| 8,914,652 B1 | 12/2014 | Conway | |
| 9,032,130 B2 | 5/2015 | Aldana et al. | |
| 9,253,295 B2 | 2/2016 | Samsilova | |
| 9,387,533 B1 * | 7/2016 | Heneveld | B22D 29/001 |
| 9,429,994 B1 | 8/2016 | Vier | |
| 9,535,457 B1 * | 1/2017 | Vier | G06F 1/1632 |
| 10,760,435 B2 * | 9/2020 | Dawson | F01D 5/18 |
| 10,969,825 B2 * | 4/2021 | Lo | G06F 1/1632 |
| 2014/0059263 A1 * | 2/2014 | Rosenberg | G06F 1/1632 |
| | | | 710/303 |
| 2014/0168884 A1 | 6/2014 | Wylie | |
| 2014/0317329 A1 * | 10/2014 | Barnett | A63F 13/92 |
| | | | 710/304 |
| 2014/0362517 A1 | 12/2014 | Moock | |
| 2016/0062411 A1 | 3/2016 | Morrison | |
| 2016/0216733 A1 * | 7/2016 | Wang | G06F 1/1632 |
| 2016/0259374 A1 | 9/2016 | Breiwa et al. | |
| 2017/0139372 A1 * | 5/2017 | Kashiide | G03G 21/1676 |
| 2018/0122201 A1 * | 5/2018 | Chiang | F16H 1/00 |

* cited by examiner

LOW-PROFILE TABLET DOCKING SOLUTION

BACKGROUND

Point-of-sale terminals are often fixed installation units. Recent developments have resulted in removable display terminals that may be used by a salesperson to keep inventory, register sales, and the like, while carried around a retail or storage establishment. The system may then be brought back to a central location and docked. However, docking solutions may make using a portable display terminal awkward and detract from the aesthetics of the unit.

DESCRIPTION OF THE DRAWINGS

Certain examples are described in the following detailed description and in reference to the drawings, in which.

DETAILED DESCRIPTION

Described herein is a docking device and computing device, such as a tablet computer of point-of-sale terminal, that allow the use of an unobtrusive lock mechanism for mounting the computing device to the docking device. Directionally programmed magnets in both the docking device and the computing device are complimentary programmed to guide the computing device into place, allowing it to be docked in the correct position. Further, the docking device uses locking blades that travel along a 3-dimensional (3D) path to engage the computing device with the docking device without interfering with the internal components of the tablet.

As used herein, a 3D motion may include both a motion along an x-axis, for example, parallel to the face of a mounting device, as well as motion along a z-axis, for example, perpendicular to the face of the mounting device. In one example, the vectors of the x-axis motion and the z-axis motion combine to give the locking blades an angular motion outwards from the face of the mounting device.

The docking device has a mounting device that is minimal and unobtrusive. For example, when a computing device is not mounted, the visible components of the mechanical system may include an angled plateau of the male plug and the two beveled ends of the locking blades. On the computing device, the visible component may include a complimentary female recess that includes slots into which the locking blades slide. In this example, both the male plug and the female recess are circular, and the walls of the plug and recess are angled. This allows a user to more easily find the correct position of the tablet on the dock as well as providing a larger area for the sliding locks to join the tablet and dock together.

Figure 1A:
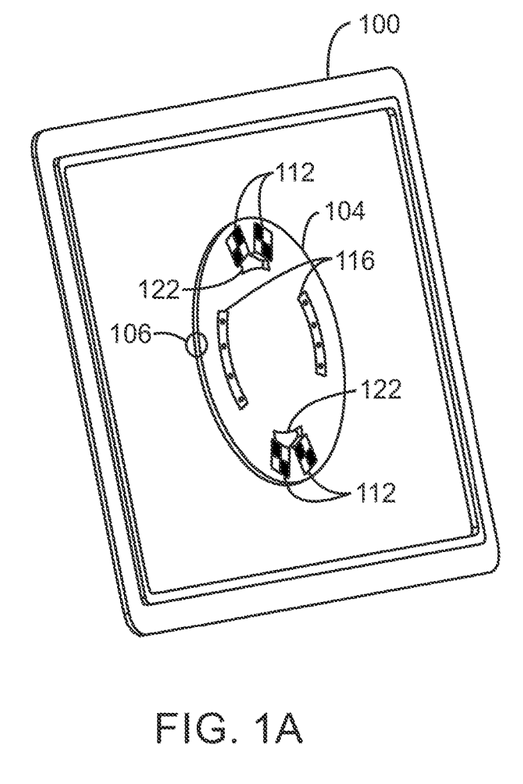
FIGS. 1A and 1B are drawings of examples of a computing device and docking device, as described herein.
Figure 1B:
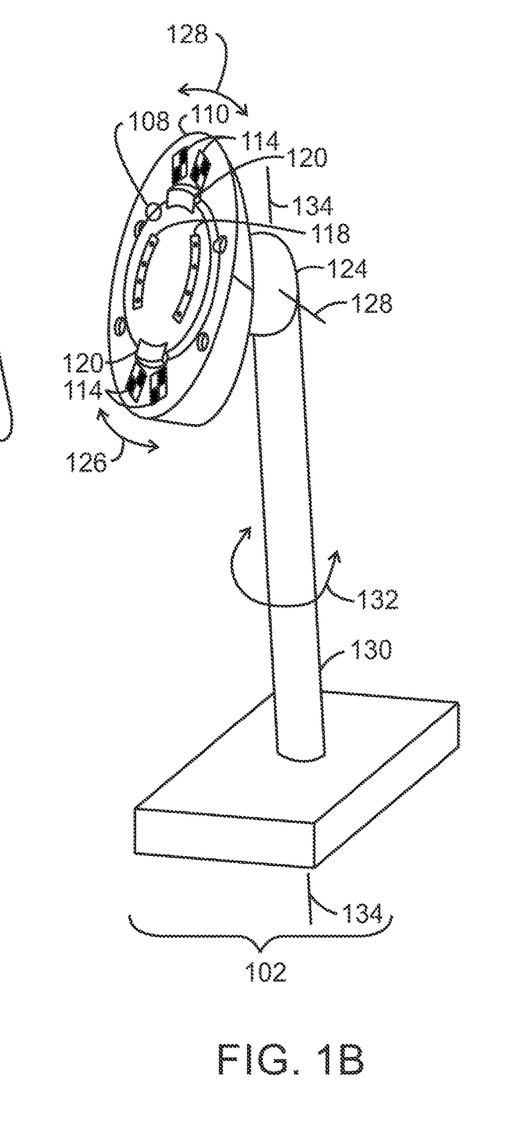

FIGS. 1A and 1B are drawings of examples of a computing device 100 and docking device 102, as described herein. In this example, the computing device 100 is a tablet computer or portable display terminal, with a mounting port 104 on the back. The mounting port 104 includes a beveled interior edge 106 designed to couple with a low-profile riser 108 on a mounting device 110 on the docking device 102.

Programmed magnets 112 placed under the back surface of the computing device 100 match oppositely programmed magnets 114 under the surface of the docking device 110, and are used to direct the computing device 100 to the correct orientation on the mounting device 108. For example, the programmed magnets 112 mate up in only one orientation with the oppositely programmed magnets 114 on the mounting device 110. It may be noted that the programmed magnets 112 and 114 on both units 100 and 102 are not generally visible, although they are shown in this figure to clarify the operation.

Further, the programmed magnet 112 and 114 may use standard magnets in simpler configurations. For example, a set of standard magnets, such as two, four, or more, may be placed under the surface of each device in a configuration that matches north to south poles. This may allow alignment while reducing the costs of the devices. Any number of other configurations may be used for the programmed magnets 112 and 114.

Once the computing device 100 is in the correct orientation on the mounting device 110, a dock interface 116, including, for example, power and data pads, may couple to a matching interface 118 of the mounting device 108. For example, the matching interface 118 of the mounting device may include spring-loaded power and data pins, such as POGO pins, designed to contact the power and data pads of the dock interface 116 of the computing device 100. When the power and data connections are made, the mounting device 108 may automatically engage locking blades 120 into slots 122 on the computing device 100 in a 3D motion as described herein.

In some examples, the data connections, the power connections, or both, may be replaced by wireless technologies. In these examples, a wireless loop antenna in the computing device 100 may communicate with a wireless loop antenna in the mounting device 110.

Once the computing device 100 is mounted, the docking device 110 may include a tilting device 124 to allow the computing device 100 to tilt up or down 126 around a horizontal axis 128 for better viewing. A swivel device 130, for example, built into the docking device 110, may allow the computing device 100 to rotate 132 around a vertical axis 134, for example, through a 90° arc, a 120° arc, through a 180° arc, or higher. This allows the computing device 100 to be rotated to face a person opposite the user, for example, a customer purchasing an item.

Figure 2:
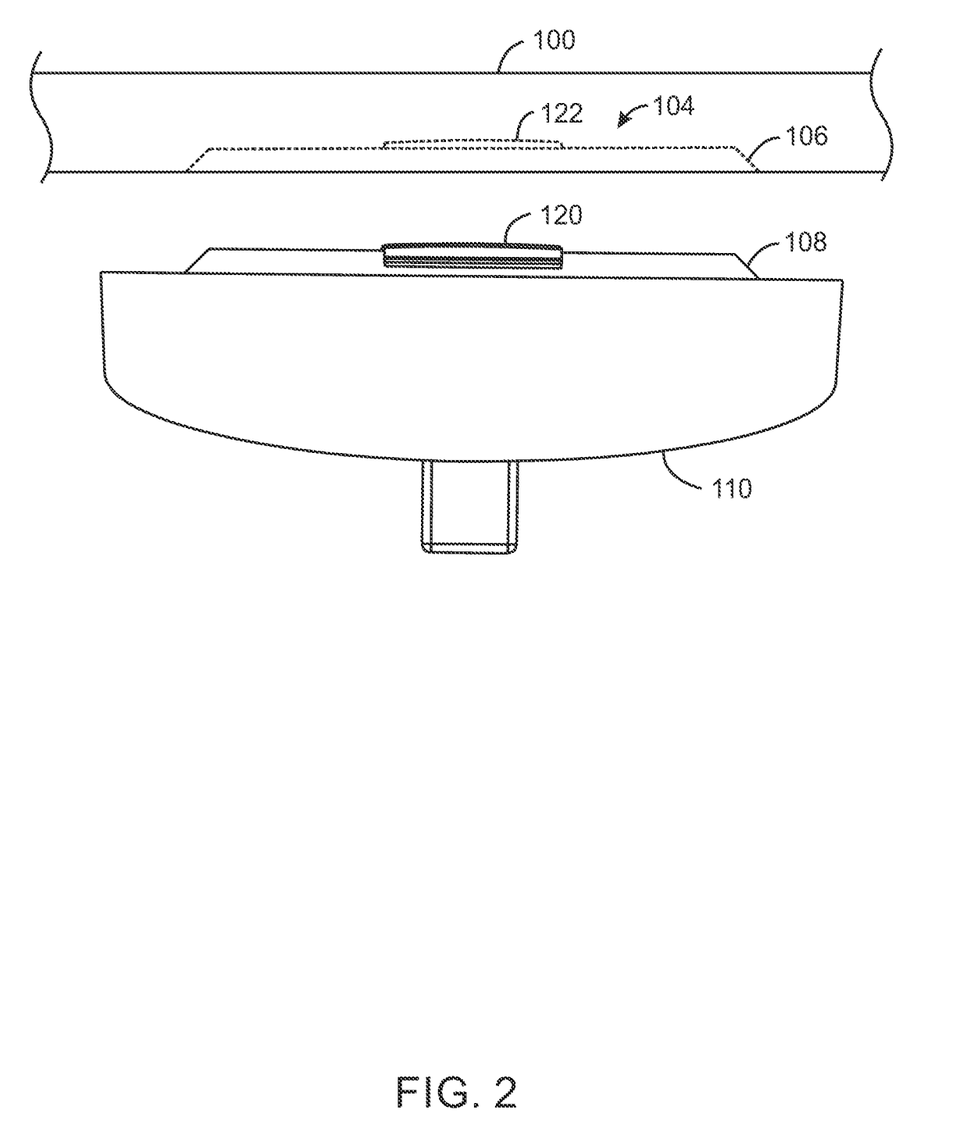
FIG. 2 is a bottom view of the examples of the mounting device and the computing device, showing a low-profile riser and a locking blade.

FIG. 2 is a bottom view of the examples of the mounting device 110 and the computing device 100, showing a low-profile riser 108 and a locking blade 120. Like numbered items are as described with respect to FIG. 1. The low-profile riser 108 helps to provide tactile feedback to a user about the position of the computing device 100 on the mounting device 110. Once the mounting port 104 of the computing device computing device 100 has been placed over the low-profile riser 108, the programmed magnets in each unit 100 and 110, may complete the alignment.

Figure 3:
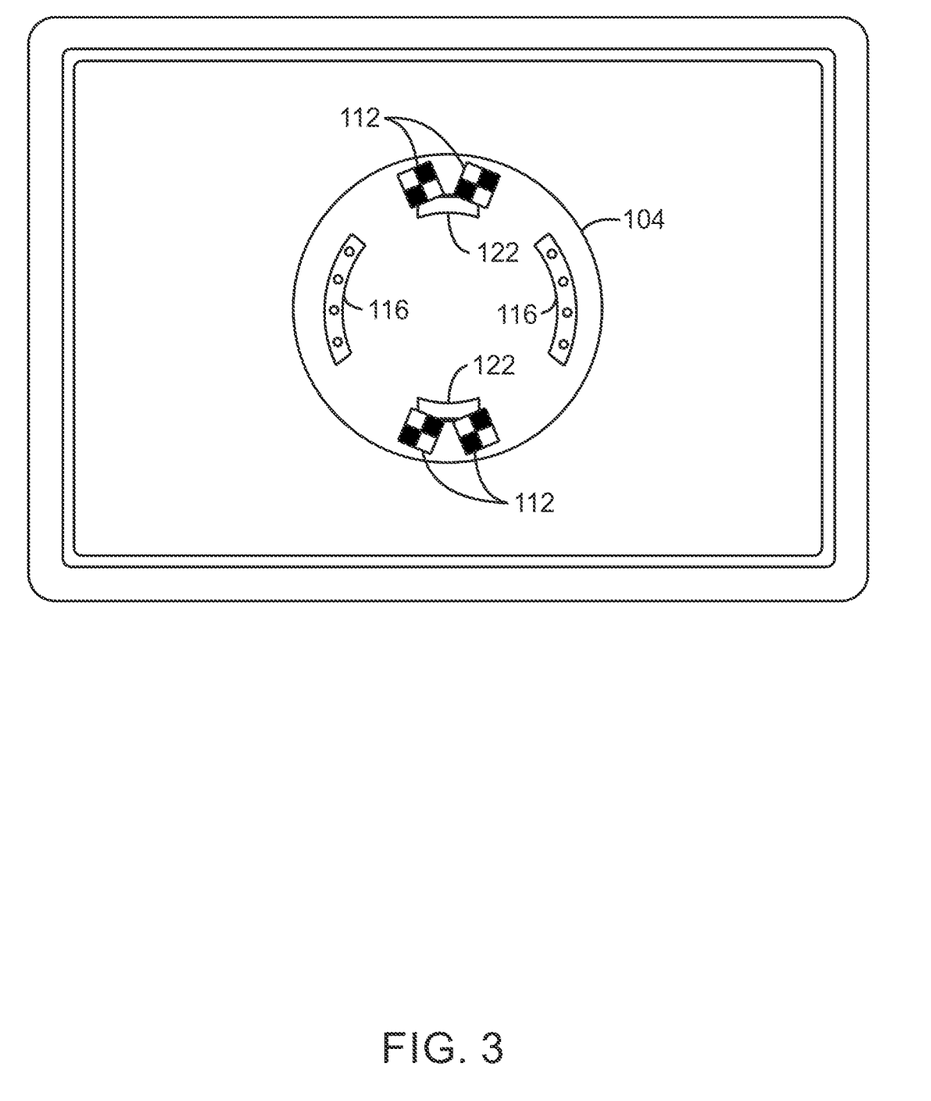
FIG. 3 is a back view of the example computing device showing the programmed magnets that may align the computing device with the mounting device.

FIG. 3 is a back view of the example computing device 100 showing the programmed magnets 112 that may align the computing device 100 with the mounting device 110. Like numbered items are as described with respect to FIG. 1. Although the mounting port 104 and low-profile riser 108 helped to guide the docking process, additional mechanical guidance is used to orient the computing device 100, and to retain the computing device on the mounting device 110 until the locking blades 120 may be engaged. As described herein, programmed magnets 112 in a magnet array may be placed in the computing device 100, for example, under the surface of the back of the computing device 100 (shown as visible in this figure to clarify the explanation).

As described with respect to FIG. 1, oppositely programmed magnets 114 may be placed in the mounting device 110, for example, as an array under the surface of the front of the mounting device 110. The interaction between the programmed magnets 110 and the oppositely programmed magnets 114 will bring the computing device 100 and the mounting device 110 together in the correct orientation, and hold them together while the locking blades 120 are engaged. This may be performed by choosing the magnets for the magnetic arrays to have different polarities at corresponding corners, creating a unique alignment array. Accordingly, the program magnets 110 and the oppositely programmed magnets 114 will only hold the computing device 100 to the mounting device 110 in the correct orientation.

The magnets may be made from any number of different materials. In one example, magnets made of thin neodymium were chosen to decrease the size of the magnets in the computing device 100 and allow more room for the internal components of the computing device 100. After the computing device 100 is placed on the mounting device 110, and the orientation is correct, electrical coupling of the data or power lines may trigger the engagement of a locking blade 120 from the mounting device 110.

Figure 4:
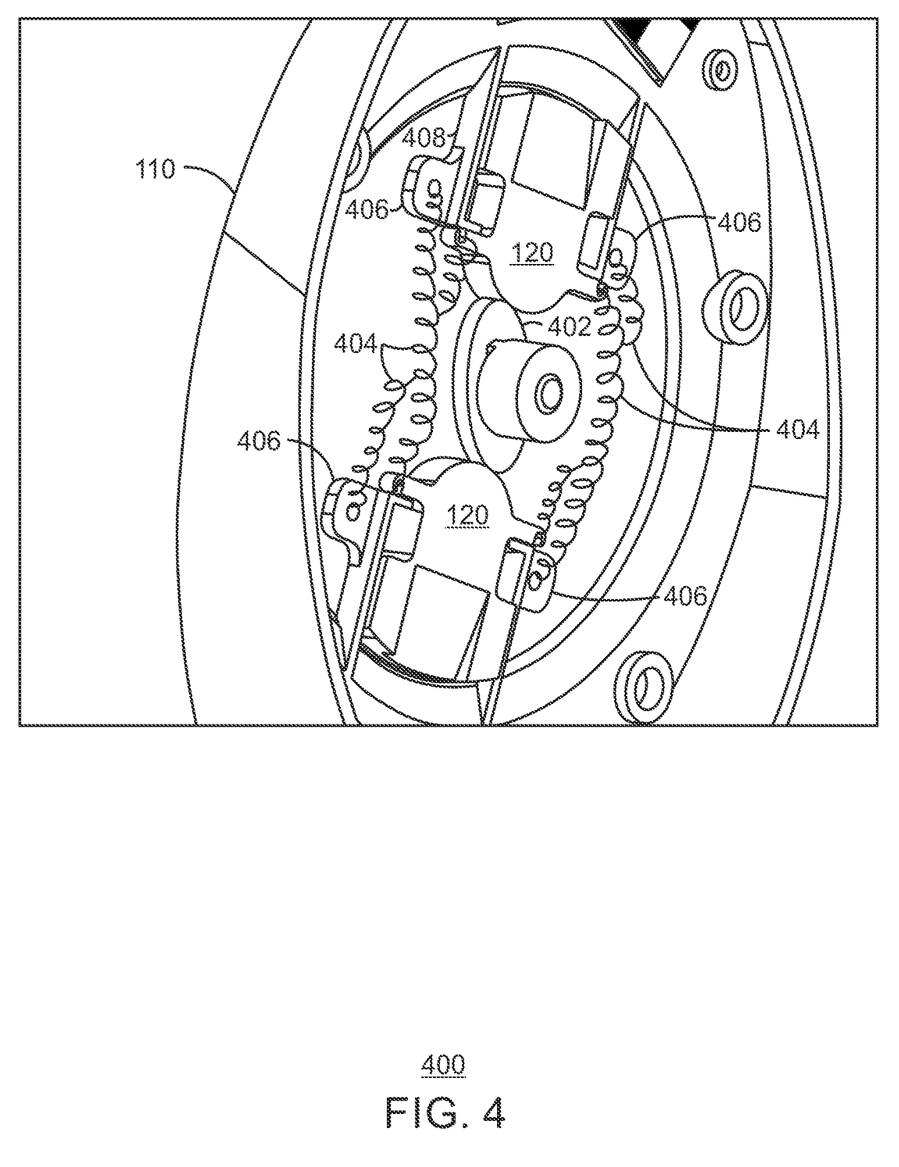
FIG. 4 is a drawing of an example of a mechanism for inserting a locking blade from the mounting device into the computing device in a 3-dimensional (3D) motion.

FIG. 4 is a drawing an example of a mechanism 400 for inserting a locking blade 120 from the mounting device 110 into the computing device in a 3-dimensional (3D) motion. Like numbered items are as described with respect to FIG. 1.

When the user places the computing device 100 on the dock in the correct position, locking of the computing device 100 onto the mounting device 110 may be automatic and performed by the mechanism 400. In the mechanism 400, a cam 402 engages the back of each of the locking blades 120. As the cam 402 is turned 90° from an initial orientation, the cam pushes the locking blades 120 outward, and into the back of the computing device 110. The locking blades 120 follow an angled path that gives them a 3D motion into the computing device 100. Accordingly, the contact point between the cam 402 on the locking blades 120 changes as the blades slide out.

Further, extension springs 404 couple tabs 406 on brackets 408 to the locking blades 120. The brackets 408 are disposed on each side of the locking blades 120 to hold them in place. As the cam 402 is returned to the initial orientation, the extension springs 404 may pull the locking blades 120 from the computing device 100. As discussed herein, the return of the cam 402 to the initial position may be performed in response to a user pressing a button on the docking device 102, or selecting an option on the computing device 100, among other actions.

Figure 5:
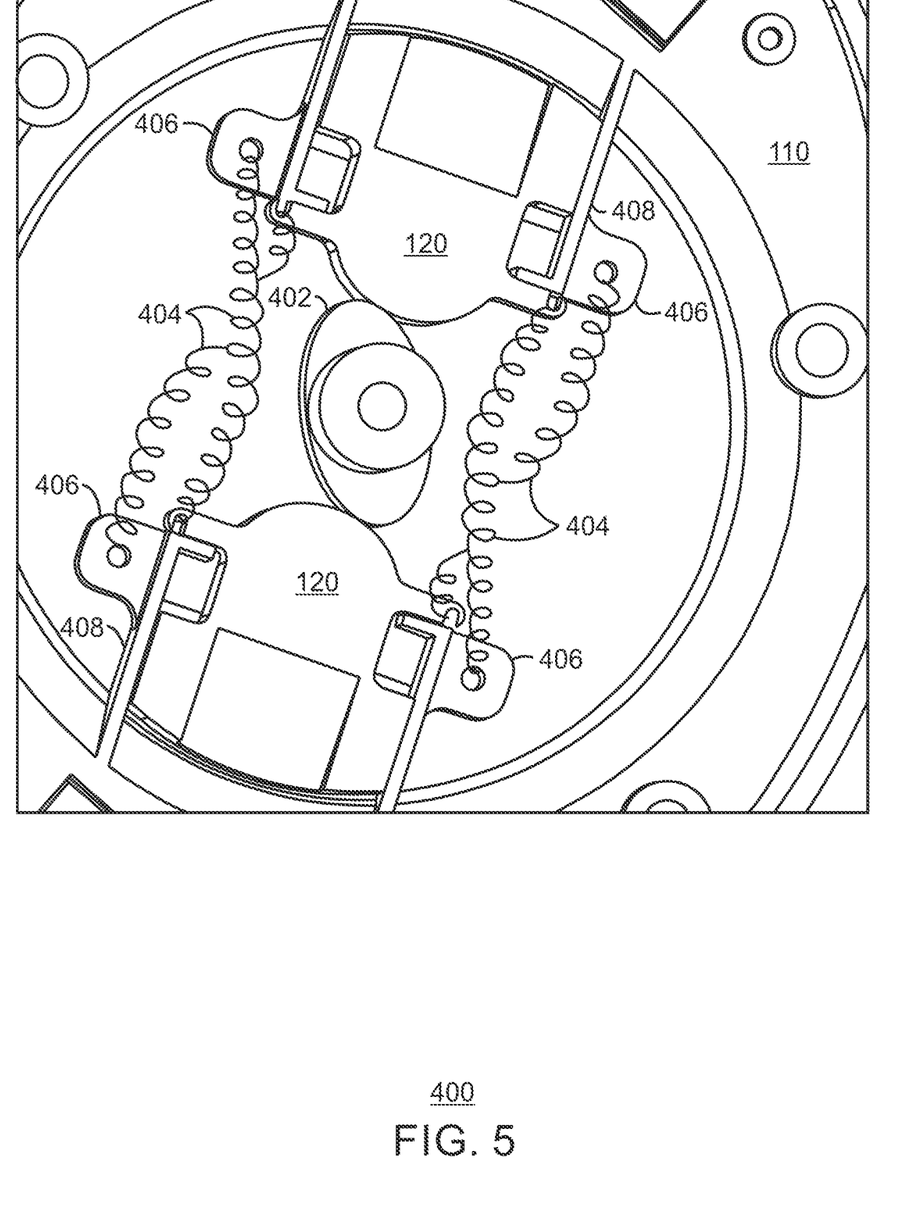
FIG. 5 is a back view of the example mechanism for inserting a locking blade from the mounting device into the computing device in a 3D motion.

FIG. 5 is a back view of the example mechanism 400 for inserting a locking blade from the mounting device into the computing device in a 3D motion. Like numbered items are described with respect to FIGS. 1 and 4. The brackets 408 may help to ensure that the locking blades 120 slide properly. Accordingly, the brackets 408 and locking blades 120 may be made from steel, while the case of the mounting device 110 may be made from aluminum.

Figure 6:
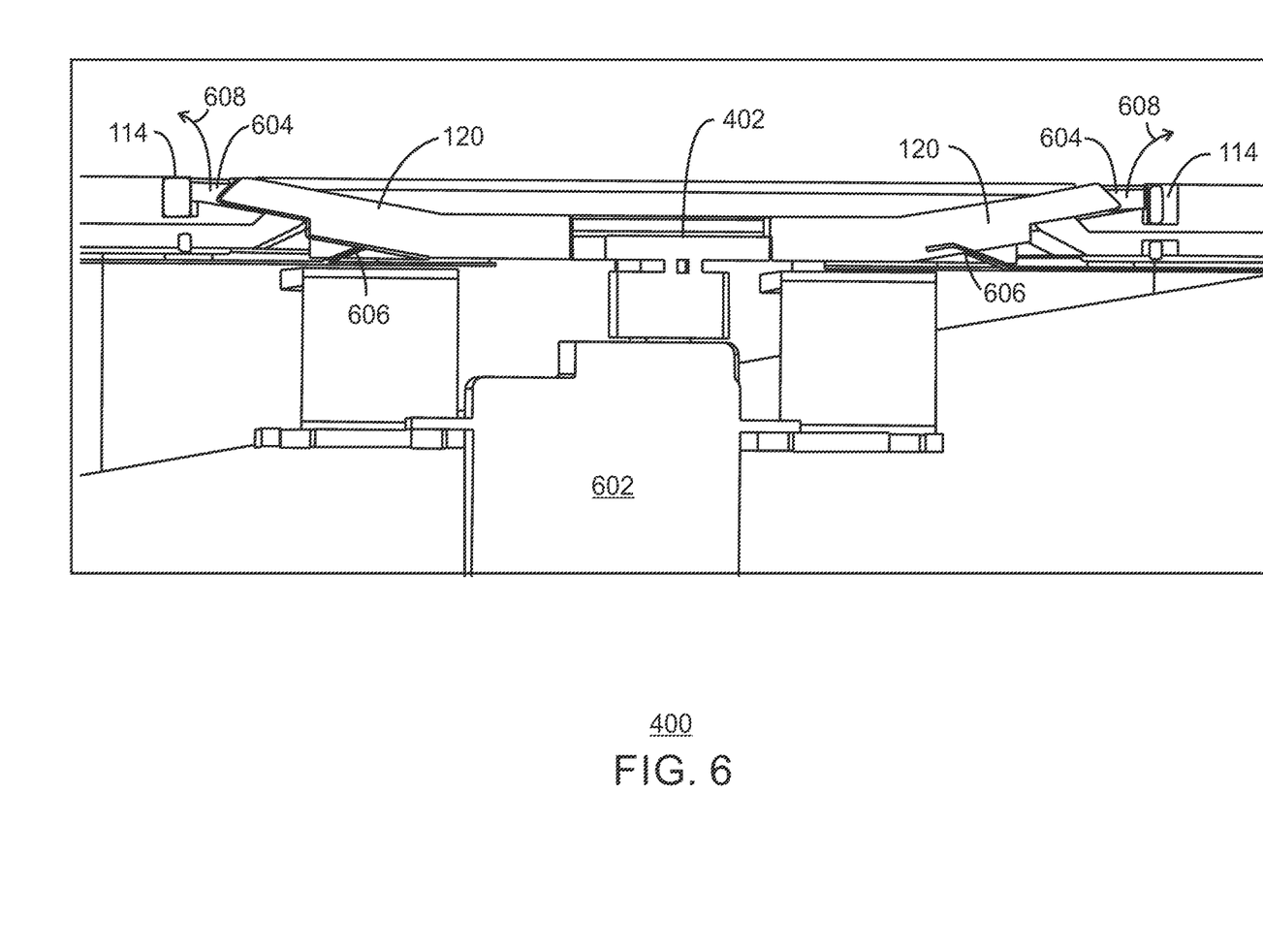
FIG. 6 is a side cross-sectional view of the example mechanism for inserting a locking blade from the mounting device into the computing device in the 3D motion.

FIG. 6 is a side cross-sectional view of the example mechanism 400 for inserting a locking blade 120 from the mounting device into the computing device in the 3D motion. Like numbered items are as described with respect to FIGS. 1 and 4. To help to improve control over the motion of the locking blades 120, a servo motor 602 may be used to drive the locking blades 120 in place to the cam 402.

Although the servo motor 602 is described herein, any number of other actuators may be used in place of the servo motor 602. For example, the locking blades 120 may be moved by a solenoid, a two-position solenoid, a stepper motor, and the like. In one example, the locking blades 120 may be moved into the locking position by springs. In this example, the locking blades 120 may be pulled back to allow mounting or removal of the computing device using the solenoid. Any number of other configurations may be used. In other examples, a two-position solenoid may be used to insert the locking blades 120 (the first position) and retract the locking blades 120 (the second position). Springs may be used to control the insertion and retraction rates.

To keep the thickness of the computing device 100 low, the mechanical engagement was designed to have a low-profile. The locking blades 120 may use a sloped blade design for the engagement. The sloped blade design provides sufficient surface area contact inside the back of the computing device 100 for strength, and reduces the depth of penetration into the rear surface of the computing device 100 to a minimum. The slots that the locking blades engage are angled and sized to match the locking blades. The sloped blade designs may allow deeper penetration into the computing device 100.

The locking blades 120 slide in angled tracks 604, for example, that may be part of the brackets 408 described with respect to FIG. 4. Angled brackets 606 that are bent, springlike metal pieces are placed in contact with the bottom surface of the locking blades 120. The angled brackets 408 help guide the locking blades 120 along a 3D path 608 when locking and unlocking.

Utilizing the angled tracks 604 and angling the locking blades 120 into the computing device 100 via a 3D path, for example, instead of a traditional 2D path, helps to pull and hold the computing device 100 in place on the mounting device 108. The 3D path may also lower the depth of the plug and recess interface decreasing the profile of the computing device. If a 2D path were used for the locking blades 120, the plug and the recess would need to be increased in depth for the locking blades 120 to properly engage the computing device. Further, there would be a loss of active downward force added by the mounting device 108.

Figure 7:
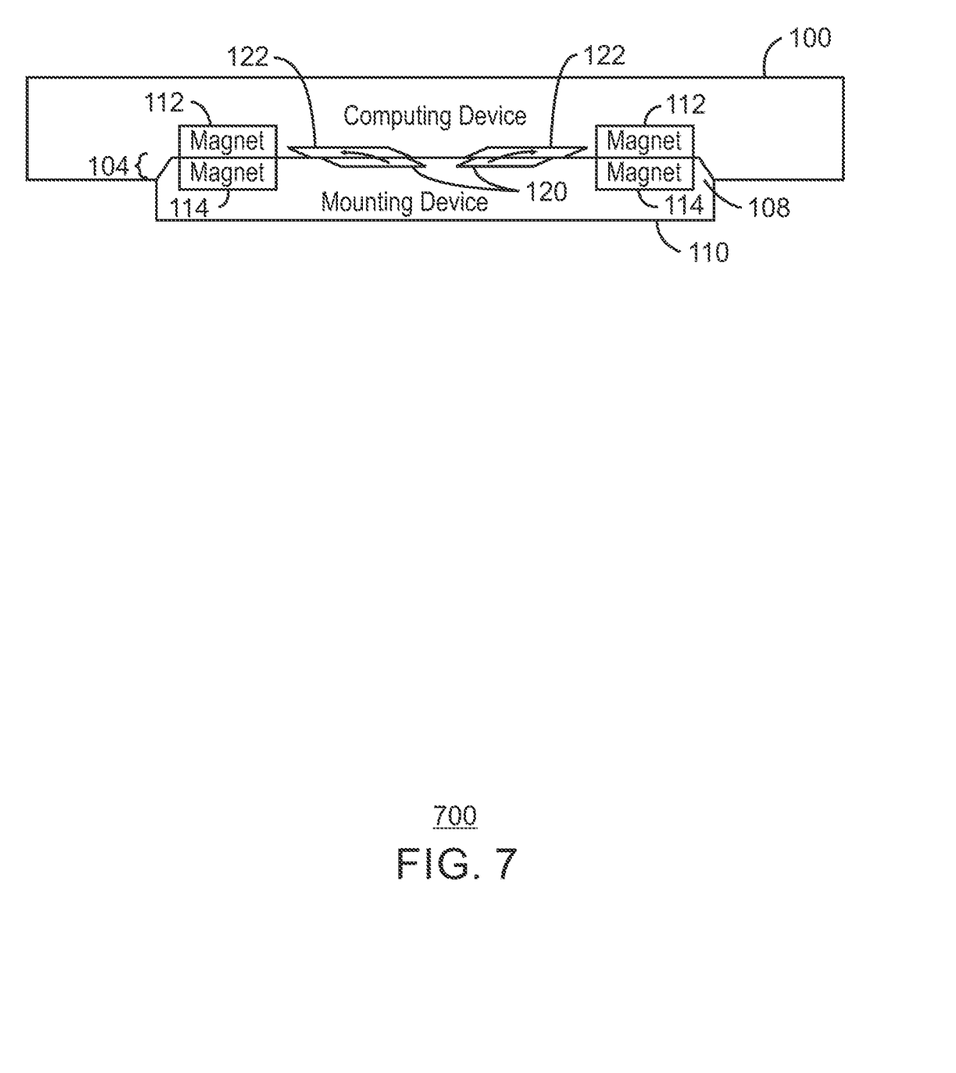
FIG. 7 is a schematic diagram of an example of a locking operation of the mounting device inserting a locking blade into the computing device.

FIG. 7 is a schematic diagram of an example of a locking operation 700 of the mounting device 110 inserting a locking blade into the computing device 100. Like numbered items are as described with respect to FIG. 1. This figure may summarize the activities described with respect to the previous figures. The computing device 100 is placed on the mounting device 110 within mounting port 104 over the low-profile riser 108. The programmed magnets 112 in the computing device 100 align with oppositely programmed magnets 114 in the mounting device.

Once in the correct orientation, data and power lines in the computing device 100 may electrically couple to corresponding data and power lines in the mounting device 110. At that point, locking brackets 120 may be automatically moved from the mounting device 110 into slots 122 on the computing device 120 in a 3D motion.

Figure 8:
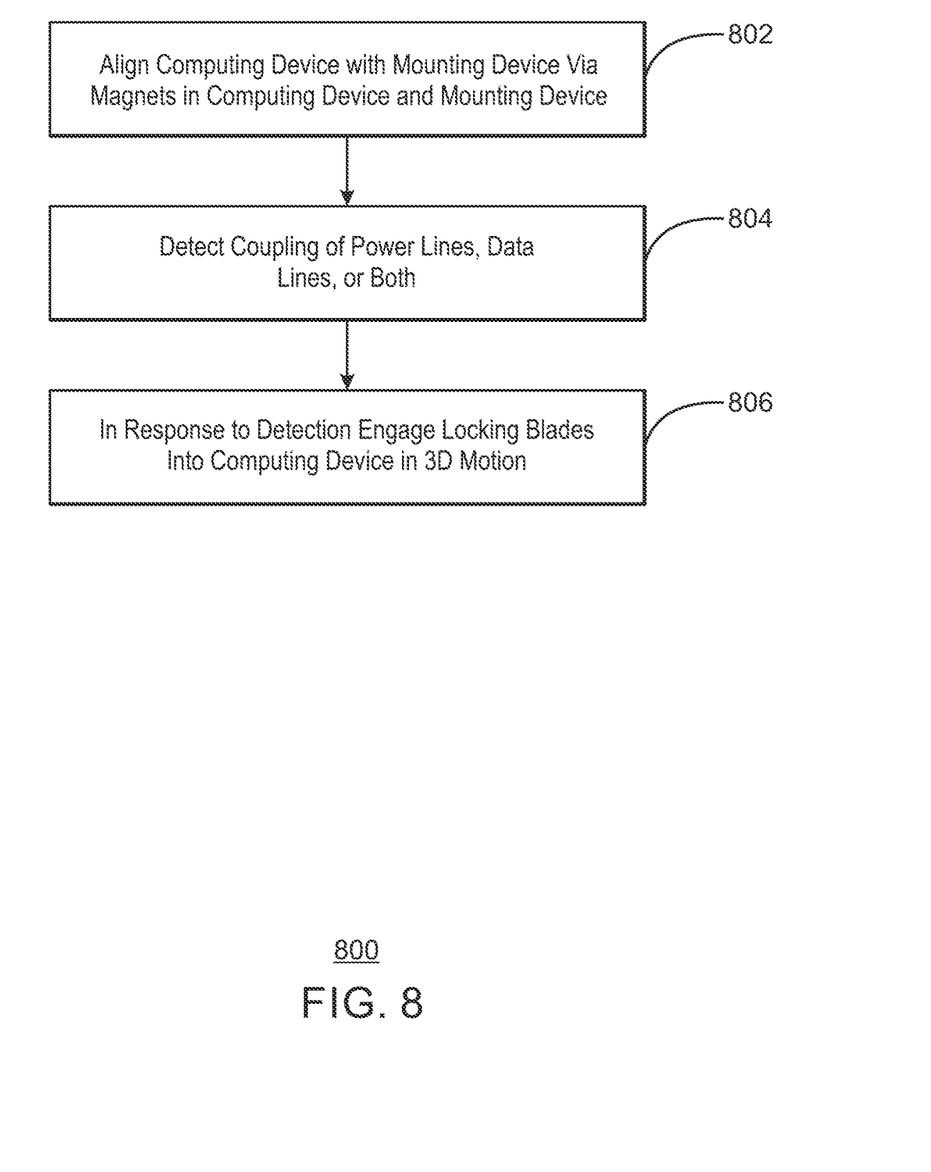
FIG. 8 is a process flow diagram of an example of a method for coupling a computing device to a mounting device.

FIG. 8 is a process flow diagram of an example of a method 800 for coupling a computing device to a mounting device. The method 800 begins at block 802 when magnets align a computing device that a user has placed onto the mounting device. This is generally done in an upright orientation wherein the recess in the back of the computing device is placed over the low-profile riser on the mounting device.

At block 804, the coupling of power lines, data lines, or both may be detected. Once the computing device is in the proper position, electrical connections, such as data or power connections, made between the computing device and the mounting device may be used to trigger motion of the servo motor within the mounting device.

At block 806, in response to the detection, the locking blades may be engaged in the slots of the computing device. This may be performed by the servo motor turning the cam 90 degrees. As the cam turns, its edge contacts the back surface of the locking blades, and thus forcing the locking blades outward to engage the computing device and load the extension springs.

In some examples, the user may initiate the undocking of the computing device by pressing a button elsewhere in the system, for example, located on the docking device. The button press sends an electrical signal to the docking device, which in turn rotates the servo back 90 degrees to the initial position. This allows the springs to pull the locking blades back into the mounting device. The user may then undock the computing device by pulling it from the mounting device with enough force to overcome the programmed magnets.

Figure 9:
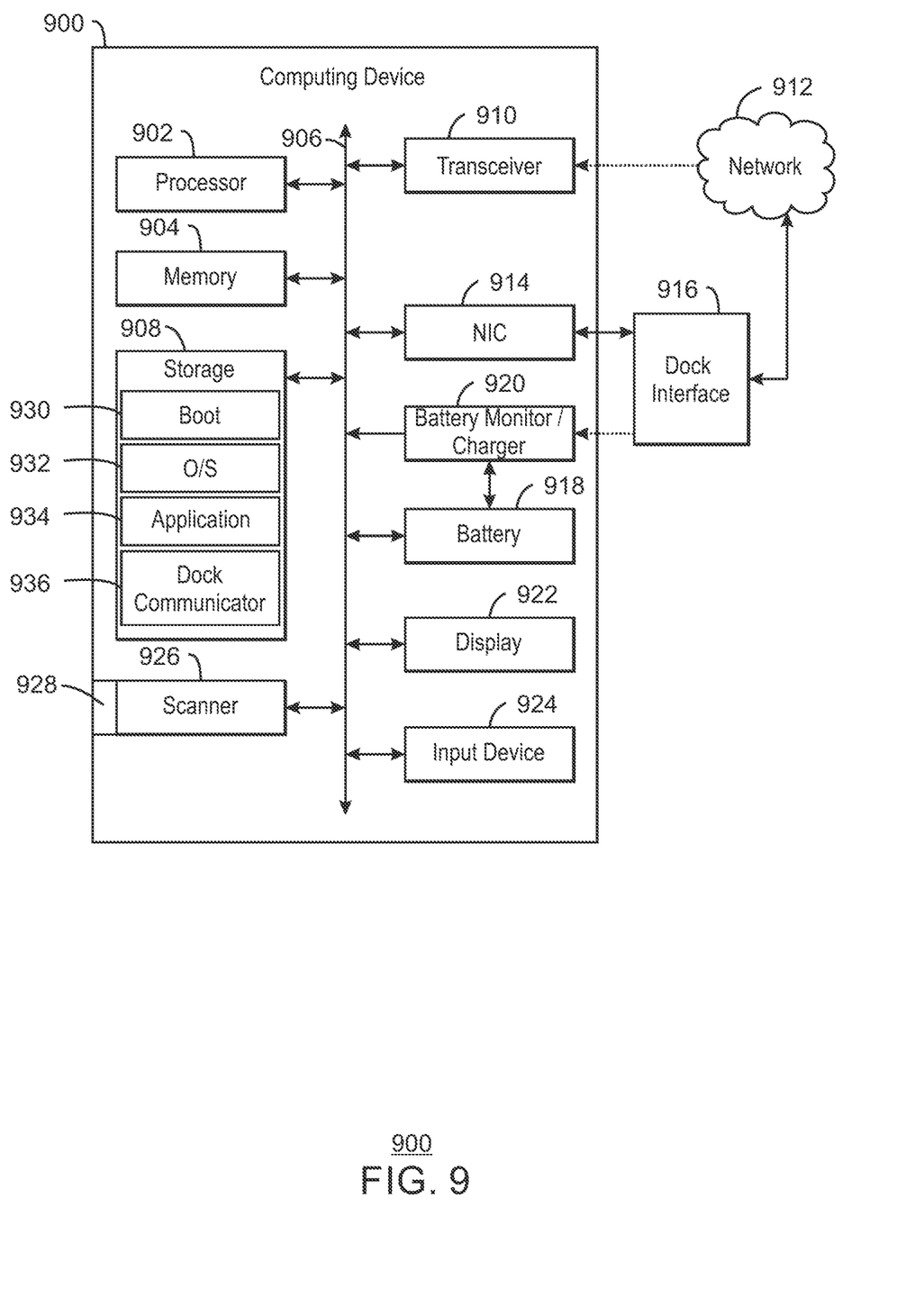
FIG. 9 is a block diagram of an example of components that may be present in the computing device.

FIG. 9 is a block diagram of an example of components that may be present in the computing device 900. The computing device 900 may be a tablet computer, a point-of-sale terminal, or any number of other devices. As used herein, a point-of-sale terminal is a device that is used for recording purchases and completing sales. In some examples, the point-of-sale terminal may have more limited functionality than a tablet computer.

The computing device 900 may include a processor 902, which may be a microprocessor, a single core processor, a multi-core processor, a multithreaded processor, an ultra-low voltage processor, an embedded processor, or any other type of processor. The processor 902 may be a part of a system-on-a-chip in which the processor 902 and other components are formed into a single integrated circuit or on a single circuit board.

The processor 902 may communicate with a system memory 904 over a bus 906. Any number of memory devices may be used to provide for a given amount of system memory, including random access memory (RAM), static random access memory (SRAM), dynamic RAM, and the like. The system memory 904 may include a set of registers associated with the processor 902, for example, for a computing device 900 that may have more limited functionality, such as a point-of-sale terminal.

A mass storage 908 may also be coupled to the processor 902 via the bus 906. The mass storage 908 may be included to provide for persistent storage of information and data. The mass storage 908 may be implemented via a solid-state drive (SSD). Other devices that may be used for the mass storage 908 include read only memory (ROM), flash memory, micro hard drives, hard drives, and the like. In some examples, the mass storage 908 and the memory 904 may be combined in a single storage unit.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may include a proprietary bus, for example, used in a SoC based system, such as in a tablet computer, a point-of-sale terminal, and the like. Other bus systems may be included, such as point-to-point interfaces and a power bus, among others.

The bus 906 may couple the processor 902 to a transceiver 910, for communications with a network 912, such as a local establishment network, a wide area corporate network or the Internet. The transceiver 910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group. The transceiver 910 may include a WLAN unit that may be used to implement Wi-Fi™ communications in accordance with the Institute of Electrical and Electronics Engineers (IEEE) 802.11 standard. In addition, wireless wide area communications, for example, according to a cellular or other wireless wide area protocol, can occur via a WWAN unit.

A network interface controller (NIC) 914 may be included to provide a wired communication link, for example, to a dock interface 916 through data connections in a mounting device. The wired communication link may provide an Ethernet protocol connection, or may provide a wired communication link that is based on other types of network and interface protocols. In some examples, the dock interface 916 may couple the computing device 900 to the network 912, providing a wired network link while docked. The transceiver 910 may be deactivated while docked, for example, for security purposes. In some examples, the dock interface 916 is not used for communications with the network 912, and the transceiver 910 remains active while docked. In some examples, the NIC 914 may be replaced with a short range wireless communication system, such as a near field communications (NFC) system.

A battery 918 may power the computing device 900 while it is undocked. The battery 918 may be a lithium ion battery, a metal-air battery, or nickel cadmium battery, among others. A battery monitor/charger 920 may be included in the computing device 900 to charge the battery 918, monitor the charging of the battery 918, and monitor the status of the charge on the battery 918.

While the computing device 900 is docked, the dock interface 916 may be electrically coupled to the battery monitor/charger 920 to charge the battery 918, for example, connections in a mounting device. In some examples, the dock interface 916 may wirelessly couple to the computing device 900 to provide the power wirelessly, for example, through a loop antenna in the computing device 900.

The bus 906 may couple the processor 902 to a display device 922. The display device 922 may be built into the computing device 900, such as a display on a tablet computer or a point-of-sale terminal, among others. In other examples, the display device 922 may include an external device coupled to the computing device 900 through an interface, for example, coupled through the dock interface 916.

An input device 924 may be coupled to the processor 902 through the bus 906. The input device 924 may be a touchscreen panel associated with the display device 922, a keyboard built into the computing device 900, a touchpad built into the computing device 900, an external pointing device, such as a mouse, connected to the computing device 900, for example, through the dock interface 916, or any combinations thereof.

In some examples, the computing device 900 may include an optical scanner 926. The optical scanner 926 may have an optical port 928, for example, located on the side of the computing device 900, to scan items such as barcodes, identifications, and the like. In some examples, an external optical device may couple to the optical scanner 926 to be used for scanning.

The mass storage 908 may include code modules to implement functionality. A booting module 930 may include start up code to boot the processor 902. An operating system 932 may be included to provide an interface between the user and the computing device 900, and to provide basic operations within the computing device 900. Applications 934 may be included to provide functionality, such as sales applications, communication applications, inventory applications, and the like.

A dock communicator 936 may be used to communicate with the docking device through the dock interface 916 when the computing device 900 is docked. In some examples, the docking device may not have separate control circuitry. In these examples, the dock communicator 936 may directly control operation of the docking device, for example, triggering a servo motor to move the locking blades into the locking position. Further, a button press on the docking device may be registered with the computing device 900, and used to trigger the server motor to allow the locking blades to move to the release position.

In some examples, the dock communicator 936 may display a selection on the screen of the computing device that may trigger release of the computing device from the docking device. When this option is selected, the dock communicator 936 may send a release instruction to the control circuitry of the docking device, which may then retract the locking blades, allowing the computing device to be removed.

In other examples, the docking device may have separate control circuitry used to control the operation of the docking device and the interface with the computing device 900. This may be as described with respect to FIG. 10.

Figure 10:
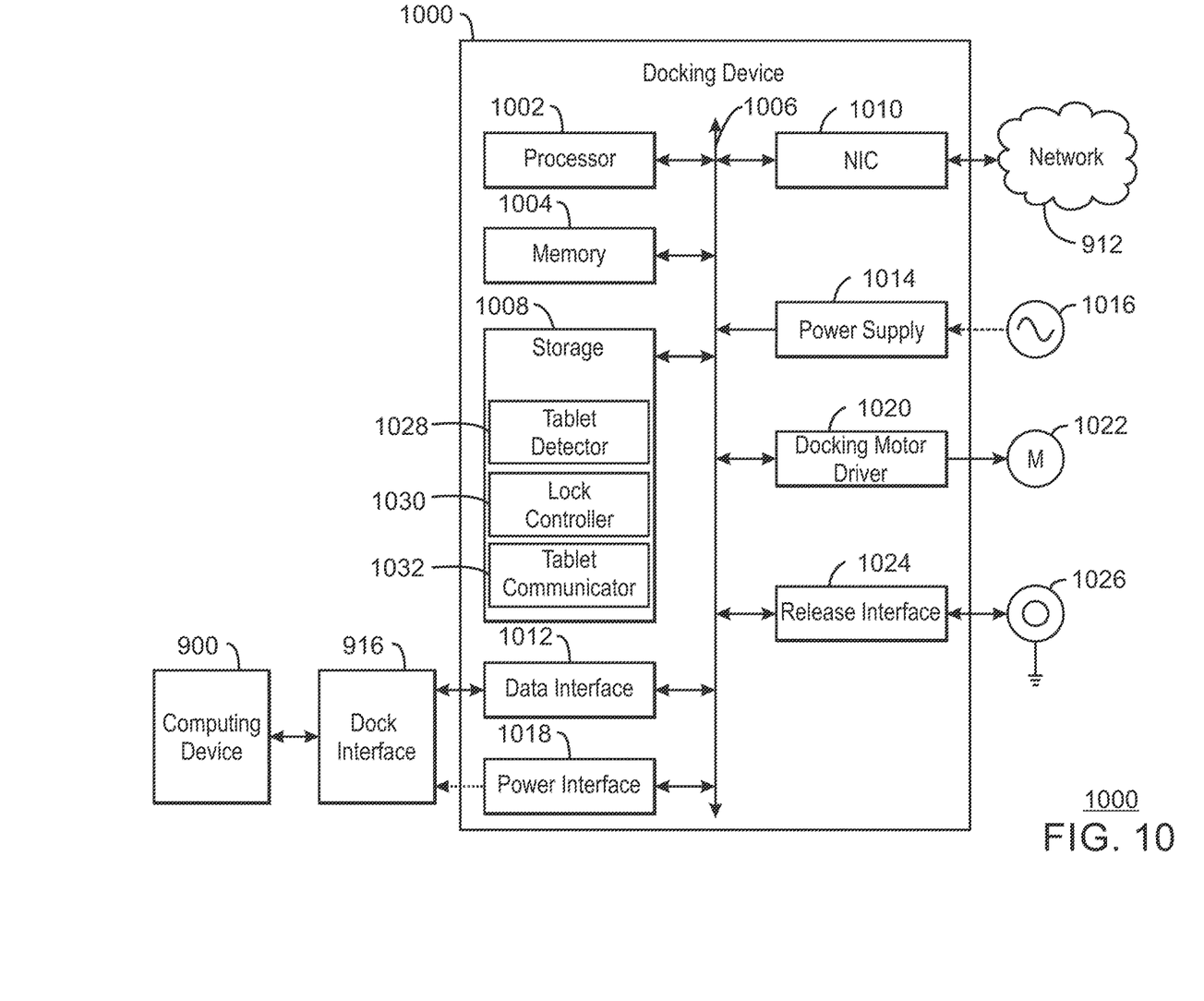
FIG. 10 is a block diagram of an example of components that may be present in a docking device.

FIG. 10 is a block diagram of an example of components that may be present in a docking device 1000. Like numbered items are as described with respect to FIG. 9. The control circuitry for the docking device 1000 may be simplified as the functions may be limited. However, in some examples, the docking device 1000 may be part of a more advanced point-of-sale system, in which the computing device 900 functions as a point-of-sale terminal for display and data entry.

The docking device 1000 may include a processor 1002, which may be a microprocessor, a single core processor, a multi-core processor, a multithreaded processor, an ultra-low voltage processor, an embedded processor, or any other type of processors. The processor 1002 may be a part of a system-on-a-chip (SoC) in which the processor 1002 and other components are formed into a single integrated circuit or on a single circuit board. In examples in which the docking device 1000 has more limited functionality, the processor 1002 may be a microprocessor on an SoC.

The processor 1002 may communicate with a system memory 1004 over a bus 1006. Any number of memory devices may be used to provide for a given amount of system memory, including random access memory (RAM), static random access memory (SRAM), dynamic RAM, and the like. In examples in which the docking device has more limited functionality, the system memory 1004 may be registers associated with the processor 1002.

A mass storage 1008 may also be coupled to the processor 1002 via the bus 1006. The mass storage 1008 may be included to provide for persistent storage of information and data. The mass storage 1008 may be implemented via a programmable memory associated with the processor 1002, a read-only memory (ROM), or a flash memory, among others. If the docking device 1000 includes more advanced functions, the mass storage 1008 may include a solid-state drive (SSD), a micro hard drive, a hard drive, a thumb drive, and the like.

The components may communicate over the bus 1006. The bus 1006 may include any number of technologies, including industry standard architecture (ISA), extended ISA (EISA), peripheral component interconnect (PCI), peripheral component interconnect extended (PCIx), PCI express (PCIe), or any number of other technologies. The bus 1006 may be a proprietary bus, for example, used in a SoC based system, such as a limited functionality docking device 1000. Other bus systems may be included, such as point-to-point interfaces and a power bus, among others.

A network interface controller (NIC) 1010 may be included to provide a wired communication link between the computing device 900 and the network 912, for example, coupling to the computing device 900 through a data interface 1012. In some examples, the docking device 1000 may not include a separate NIC 1010. In these examples, the signals from the NIC in the computing device 900 may be directly coupled to the network 912, for example, through the data interface 1012.

The docking device 1000 may use a power supply 1014 that is directly coupled to an electric power grid 1016. The power from the power supply 1012 may also be supplied to the computing device 900, for example, through a power interface 1018 that couples to power connections in the dock interface 916.

A docking motor driver 1020 may be used to drive a servo motor 1022 to engage the locking blades into the computing device 900. In some examples, the docking motor driver 1020 is directly coupled to data lines in the data interface 1012 to allow the computing device 900 to control the operation of the servo motor 1022.

A release interface 1024 may be coupled to a release button 1026 that, when pressed, triggers the docking device 1000 to operate the server motor 1022 to allow the locking blades to return to an unlocked position. In some examples, the release interface 1024 is directly coupled to data lines in the dock interface 916 through the data interface 1012 to allow the computing device 900 to detect the release signal from the release button 1026.

The mass storage 1008 may include code modules to implement functionality. A tablet detector 1028 may detect when a computing device 900, such as a tablet or a point-of-sale terminal, is placed on a mounting device. A lock controller 1030 may control the servo motor 1022 to engage locking blades in the computing device 900 after its presence is detected. A tablet communicator 1032 may receive commands from a docked computing device 900, for example, including a release command to activate the servo motors 1022 and allow the locking blades to retract.

In examples in which the docking device 1000 is part of a more complex point-of-sale system, any number of other devices may be coupled to it. For example, a display device may be coupled to the docking device 1000, or to the computing device 900 through the docking device 1000, such as a sign, a monitor, projector, and the like. An input device may be coupled to the docking device 1000, or to the computing device 900 through the docking device 1000, such as a keyboard, a touchpad, a mouse, and the like. Other devices, such as receipt printers, laser printers, inkjet printers, scanners, and the like, may be coupled to the docking device 1000, or to the computing device 900 through the docking device 1000.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A system including a docking device to receive a tablet computing device, wherein the docking device comprises:
   a magnet array to align the tablet computing device with a mounting device on the docking device; and
   a locking blade that inserts from the mounting device into the tablet computing device in a 3-dimensional (3D) motion in which the locking blade moves outwardly away from a center of the mounting device in a plane parallel to a rear surface of the tablet computing device and also in a direction perpendicular to the plane to engage an interior portion of the tablet computing device.

2. The system of claim 1, wherein the docking device comprises a swivel device that allows the tablet computing device to rotate through at least a 180° arc around a vertical axis after docking.

3. The system of claim 1, wherein the locking blade follows and slides over a surface of an angled track in an outwards motion from the mounting device into the tablet computing device.

4. The system of claim 3, wherein the angled track has a flat portion parallel to a rear surface of the tablet computing device and a second angled portion that angles away from the mounting device and toward the tablet computing device.

5. The system of claim 1, wherein the docking device further comprises a circular plug or recess that complements a corresponding plug or recess of the tablet computing device, wherein walls of the circular plug or recess are sloped, and walls of the plug or recess of the tablet computing device comprise slots into which the locking blade slides.

6. The system of claim 1, wherein the locking blade comprises first and second blades that move outwardly from each other to engage the table computing device.

7. The system of claim 1, wherein the mounting device comprises a motor to drive the locking blade into the tablet computing device in the 3D motion.

8. The system of claim 6, further comprising a cam located between the first and second blades wherein rotation of the cam extends the first and second blades outwardly in opposite directions to engage the tablet computing device.

9. The system of claim 1, wherein a tablet communicator of the docking device sends an alert command to the tablet computing device before releasing the tablet computing device from the mounting device.

10. The system of claim 3, wherein the tablet computing device comprises a mounting port on a mounting side, wherein the mounting port provides a flat profile to a back surface of the tablet computing device.

11. The system of claim 10, wherein the mounting port comprises an inclined slot that is inclined matching the surface of the angled track and that is sized to accept the locking blade from the mounting device.

12. The system of claim 1, wherein the tablet computing device comprises a dock interface that forms a data connection and a power connection between the tablet computing device and the mounting device.

13. The system of claim 8, further comprising springs to bias the first and second blades toward each other when not extended by the cam.

14. The system of claim 1, wherein the docking device is to receive, from a dock communicator of the tablet computing device, a release command to the mounting device to allow the tablet computing device to be removed from the mounting device.

15. The system of claim 1, wherein the magnet array comprises multiple separate magnetic arrays, each separate magnetic array having multiple, different magnetic poles arranged to match a corresponding array on the other of the tablet computing device or docking device.

16. A method for coupling a computing device to a mounting device, comprising:
    aligning the computing device with the mounting device via magnets built into the computing device and the mounting device;
    detecting that a power connection, a data connection, or both has been made; and
    engaging locking clamps into the computing device from the mounting device in a three-dimensional (3D) motion in response to the detection of the power connection, the data connection, or both.

17. The method of claim 16, comprising:
    detecting a button press on the mounting device; and
    releasing the computing device from the mounting device in response to the pressing of the button.

18. A system including a docking device for a computing device comprising a tablet computer, wherein the docking device connects to a rear of the tablet computer opposite a front of the tablet computer that includes a touchscreen, wherein the docking device comprises:
    a magnet array to match a corresponding magnet array on the computing device to align the computing device with a mounting device on the docking device; and
    a locking blade that inserts from the mounting device into a complimentary female recess of the computing device in a 3-dimensional (3D) motion in which the locking blade moves outwardly away from a center of the mounting device in a plane parallel to a rear surface of the computing device and also in a direction perpendicular to the plane to engage an interior portion of the computing device.

19. The system of claim 18, further comprising an angled track for the locking blade, wherein the locking blade follows the angled track when inserted into a rear of the computing device, the angled track sloping away from the mounting device and toward the computing device in a direction outward from the mounting device.

20. The system of claim 18, wherein the docking device is to extend the locking blade in response to a power or data connection being established between the docking device and computing device.

\* \* \* \* \*